US005943340A

United States Patent [19]
Iemura

[11] Patent Number: 5,943,340
[45] Date of Patent: Aug. 24, 1999

[54] CHANNEL ASSIGNMENT CONTROLLING SYSTEM

[75] Inventor: Takaya Iemura, Tokyo, Japan

[73] Assignee: NEC Corporation, Japan

[21] Appl. No.: 08/792,100

[22] Filed: Jan. 31, 1997

[30] Foreign Application Priority Data

Feb. 2, 1996 [JP] Japan .................................. 8-040672

[51] Int. Cl.$^6$ ................................................. H04L 12/28
[52] U.S. Cl. ......................... 370/431; 370/337; 370/329
[58] Field of Search .................................... 370/252, 329, 370/336, 337, 347, 431, 437; 455/450, 451, 452, 62, 63, 67.1, 509

[56] References Cited

U.S. PATENT DOCUMENTS

| | | | |
|---|---|---|---|
| 5,280,630 | 1/1994 | Wang ........................................ | 455/452 |
| 5,471,671 | 11/1995 | Wang et al. .......................... | 455/226.2 |
| 5,507,008 | 4/1996 | Kanai et al. ............................. | 455/512 |
| 5,619,507 | 4/1997 | Tsuda ...................................... | 370/350 |
| 5,805,982 | 9/1998 | Hulsebosch ............................... | 455/62 |

FOREIGN PATENT DOCUMENTS

| | | |
|---|---|---|
| 2292655 | 2/1996 | United Kingdom . |
| 96 31989 | 10/1996 | WIPO . |
| 96 31990 | 10/1996 | WIPO . |

*Primary Examiner*—Jeffery A. Hofsass
*Assistant Examiner*—Mitchell Slavitt
*Attorney, Agent, or Firm*—Ostrolenk, Faber, Gerb & Soffen LLP

[57] ABSTRACT

A channel assignment controlling system is disclosed that comprises a terminal unit, a base station, and a channel assignment controlling portion. The terminal unit comprises a demodulator, a modulator, and a channel controller that controls channels and time slots of the modulator. The base station comprises an extractor, a signal detector, a demodulator, a unique word detector, and a modulator. The extractor inputs an output signal of the terminal unit and extracts a signal with the frequency of the channel of the base station. The signal detector determines whether or not a signal has been received. The demodulator demodulates the input signal. The unique word detector detects a unique word and outputs data from which preamble has been removed from the input signal corresponding to output signals of the signal detector and the unique word detector. The channel assignment controlling portion determines channels and time slots corresponding to an output signal of the base station.

15 Claims, 7 Drawing Sheets

CHANNEL ASSIGNMENT CONTROLLING SYSTEM

BACKGROUND OF THE INVENTION

1. Field of the Invention

The present invention relates to a channel assignment system for use with TDMA (Time Division Multiple Access) communication system for transmitting information from a base station to a terminal unit corresponding to a transmission request thereof with a plurality of channels, in particular, to a channel assignment system of which the base station assigns channels with small interference as communication channels with the terminal unit corresponding to history of the used channels so as to improve the quality of uplink channels used to transmit data from the terminal unit to the base station.

2. Description of the Related Art

The channel assignment system for assigning channels with small interference corresponding to history thereof has been disclosed in for example Japanese Patent Laid-Open Publication 61-244137 as a related art reference. This related art reference is a radio communication system having a function for starting communication after verifying that a channel to be used is a blank channel. Individual channels are assigned priority levels. Channels are preferentially used in the order of higher priority levels by turns. The priority levels of the channels are variably assigned corresponding to the history that have been used in the channel.

FIG. 6 is a block diagram showing the structure of the conventional channel assignment system. As shown in FIG. 6, this system comprises a mobile station terminal (MS) 610, an antenna 621, a modulator (MOD) 622, a synthesizer (SYN) 623, a microprocessor (MPU) 624, a demodulator (DEM) 625, and a power detector (DET) 626.

In this system, at a communication request wait state, the microprocessor 624 selects a control channel as a communication channel and controls the synthesizer 623. A communication request of the mobile station terminal 610 is sent through the control channel. When the mobile station terminal 610 issues a communication request, a signal of the communication request is input from the antenna 621. The demodulator 625 demodulates the signal and inputs the demodulated signal to the microprocessor 624. The microprocessor 624 starts the channel selecting operation. The power detector 626 measures the power of the received signal of the channel selected by the microprocessor 624 and supplies to the microprocessor 624 a determination signal that represents whether or not the power of the received signal exceeds a predetermined threshold value.

FIG. 7 is a flow chart showing the channel selecting operation of the microprocessor 624.

When there is no communication request, the microprocessor 624 waits until a communication request is received through the control channel (at step 701). When the microprocessor 624 receives a communication request (at step 702), the microprocessor 624 selects a channel with the highest priority level (at steps 703 and 704).

When this channel is busy, the microprocessor 624 selects a channel with the next highest priority level. After repeating this operation, if a channel with the lowest priority level is busy, the microprocessor 624 sends a call loss signal to the mobile station terminal 610 (at steps 704 and 707 to 709).

Even if the selected channel is not busy (namely, the determined result at step 704 is No), when the determination signal that the power of the received signal exceeds a predetermined threshold value, has been supplied from the power detector 626 (at step 705), since the power of the interference wave is large, the microprocessor 624 determines that this channel cannot be used, decreases the priority level of the channel (at step 706), and selects a channel with the next highest priority level (at steps 707 and 708).

After repeating this operation, when the microprocessor 624 had determined that a channel with the lowest priority level cannot be used, it sends a call loss signal to the mobile station terminal 610 (at step 709).

When the selected channel is not busy and the microprocessor 624 has received the determination signal that the power of the received signal does not exceed a predetermined threshold value (namely, the determined result at step 705 is No), the microprocessor 624 increases the priority level of the channel (at step 710), and assigns the channel with the increased highest priority level (at step 711).

When such an operation is performed corresponding to each communication request, the priority level of a channel with small interference increases, whereas the priority level of a channel with large interference decreases. In other words, the microprocessor 624 can learn the interference distribution of each channel. When channels are selected in the order of higher priority levels, channels with small interference can be used. Thus, the channel quality of the entire system can be improved.

In the conventional channel controlling system shown in FIG. 6, since each mobile station terminal uses one whole channel, when a channel is selected, the amount of interference can be measured corresponding to the power of the received signal of the channel.

However, in the TDMA system, since one channel is divided into time slots, one channel is shared by a plurality of mobile station terminals. Thus, when the amount of interference is measured by the conventional channel controlling system, the power of the received signal should be measured at a time of a blank slot. Thus, a complicated control process is required.

SUMMARY OF THE INVENTION

The present invention is made from the above-described point of view. An object of the present invention is to provide a channel assignment controlling system for learning an interference distribution of each channel and preferentially using a channel with small interference corresponding to output signals of a signal detector and a unique word detector that are common in a demodulating unit of the TDMA system without need to use complicated circuits and processes so as to improve the channel quality of the system.

To accomplish the above-described object the present invention is a channel assignment controlling system having plural terminal units and a base station for transmitting information from the base station to plural terminal units corresponding to a transmission request issued from the terminal unit, comprising a channel assignment controlling means for learning a distribution of interference noise of each channel corresponding to history information of whether or not a signal has been detected by a signal detector of the base station and whether or not a unique word has been detected by a unique word detector that detects the unique word corresponding to the received signal, determining priority levels of individual channels in the order of smaller interference noise, and preferentially using channels with higher priority levels so as to improve the quality of up-link channels used to transmit information from the terminal to the base station.

In the present invention, the channel assignment controlling means counts the number of times of which the unique word has not been detected although the signal has been detected or calculates the probability of which the signal is normally detected corresponding to history information of whether or not the signal has been detected by the signal detector of the base station and whether or not the unique word has been detected by the unique word detector that detects the unique word corresponding to the received signal so as to learn the distribution of the interference noise of each channel, determine priority levels of individual channels in the order of smaller interference noise, and preferentially use channels with higher priority levels.

The present invention is a TDMA communication system using a plurality of channels, in particular, a channel assignment controlling system for learning a distribution of each channel and preferentially using a channel with small interference so as to improve the channel quality of the system. The terminal unit, the base station modem, and the channel assignment controlling portion are preferably structured as follows.

In the present invention, the terminal unit comprises a demodulator for inputting an output signal of the base station and demodulating the signal, a modulator for outputting a transmission signal, and a channel controller for controlling a channel and time slots for the modulator corresponding to information of an output signal of the demodulator, wherein the modulator outputs the transmission signal with the frequency of the channel and time slots controlled by the channel controller.

In the present invention, the base station comprises an extractor for inputting an output signal of the terminal unit and extracting only a signal with the frequency of the channel for the base station from the output signal of the terminal unit, a signal detector for inputting an output signal of the extractor and measuring the power thereof so as to determine whether the receive signal is present, a demodulator for inputting an output signal of the extractor and an output signal of the signal detector and demodulating the input signals, a unique word detector for inputting an output signal of the demodulator and an output signal of the signal detector, detecting a unique word in the input signal, and determining whether or not the signal has been detected and whether or not the unique word has been detected, and a modulator for inputting an output signal of a channel assignment controlling means that assigns a used channel and a time slot at the terminal unit and outputting the transmission signal to the base station.

According to the present invention, the channel assignment controlling portion determines the channel and the time slots of the terminal unit corresponding to an output signal of the unique word detector and outputs a control signal thereof.

In the channel assignment controlling system according to the present invention, output signals of the signal detector and the unique word detector that are used in the demodulating unit of the TDMA system are detected. At this point, the number of times of which the unique word has not been detected although the output signal of the signal detector has been detected is counted so as to learn the distribution of interference noise of each channel. A channel with small interference is preferentially used so as to improve the channel quality of the system.

The signal detector determines whether the measured power exceeds the predetermined threshold value. When the signal detector has determined that the signal has been received, the signal is demodulated and thereafter, the unique word is detected.

When the signal detector has detected a signal, a unique word must have been normally detected. Causes for why the unique word has not been detected although the signal has been detected are for example (1) the signal detector has mistakenly detected a signal due to large interference noise and (2) interference noise caused a code error of the unique word and thereby the unique word has not been detected.

In any case, the fact that the unique word has not been detected although the signal has been detected represents that the channel has large interference noise.

Thus, when the number of times when the unique word has not been detected although the signal has been detected is counted or when the ratio of normally detected times of the unique word and abnormally detected times thereof is calculated, the distribution of interference noise of each channel can be learned.

These and other objects, features and advantages of the present invention will become more apparent in light of the following detailed description of a best mode embodiment thereof, as illustrated in the accompanying drawings.

DESCRIPTION OF PREFERRED EMBODIMENT

An embodiment of the present invention will be described with reference to the accompanying drawings.

Figure 1:
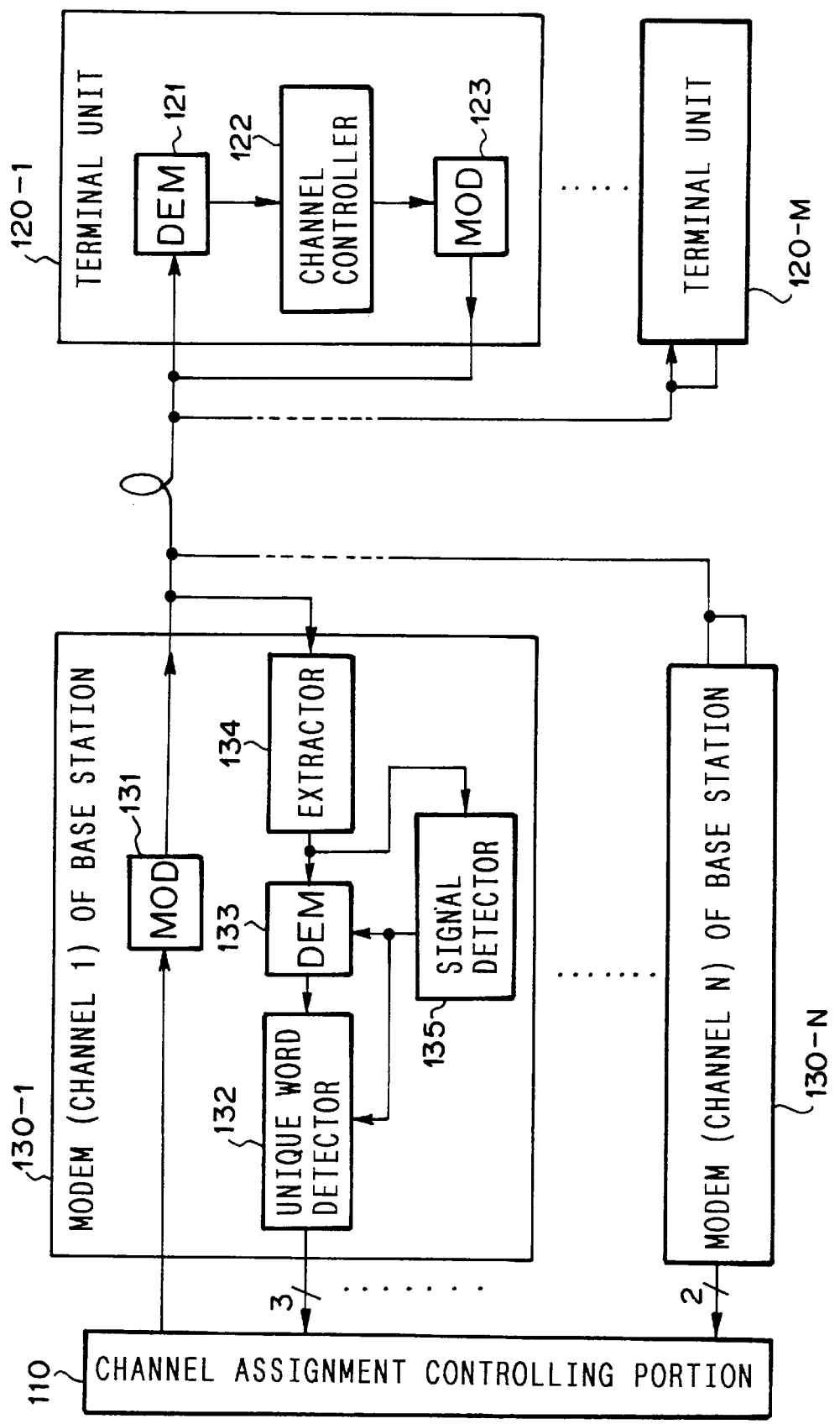
FIG. 1 is a block diagram showing the structure of an embodiment of the present invention.

FIG. 1 is a block diagram showing the structure of the embodiment of the present invention. Although FIG. 1 shows the structure of a wired communication system, it should be noted that the present invention is not limited to such a system. Instead, the present invention can be applied to a radio communication system. The system shown in FIG. 1 has a terminal unit 120 that comprises a demodulator (DEM) 121, a channel controller 122, and a modulator (MOD) 123. The demodulator (DEM) 121 inputs an output signal of a modem (MODEM) 130 of a base station. The channel controller 122 controls a channel and time slots of the modulator (MOD) 123 corresponding to an output signal of the demodulator 121. The modulator (MOD) 123 modulates a signal with the frequency of the channel and the time slots controlled by the channel controller 122.

The modem (MODEM) 130 of the base station comprises an extractor 134, a signal detector 135, a demodulator (DEM) 133, a unique word detector 132, and a modulator (MOD) 131. The extractor 134 extracts a signal with the frequency of the channel of the base station. The extractor 134 includes a tuned radio frequency amplifying circuit and a mixer circuit. The signal detector 135 measures the power of the input signal from the output signal of the extractor 134 so as to determine whether or not the signal has been received. The demodulator (DEM) 133 inputs an output signal of the extractor 134 and an output signal of the signal detector 135 and demodulates the input signals corresponding to the modulating system thereof. The unique word detector 132 inputs an output signal of the demodulator 133 and an output signal of the signal detector 135, detects a unique word from the input signal (received signal), and outputs only a data portion of which a preamble has been removed from the input signal corresponding to the output signal of the signal detector 135 and the output signal of whether or not the unique word have been detected by this unique word detector 132. The modulator (MOD) 131 inputs an output signal of the channel assignment controlling portion 110 and outputs a transmission signal with a predetermined frequency.

In addition, the system has a channel assignment controlling portion 110 that inputs an output signal of the unique word detector 132 of the modem (MODEM) 130 of the base station, determines a channel and time slots for the terminal unit 120, and outputs a control signal. The unique word is composed of 10 bits to several ten bits preceded by a preamble portion (including a clock signal and a carrier reproducing synchronization signal) at the beginning of each time slot of the TDMA system. The unique word is followed by real data.

In FIG. 1, as the modem 130 of the base station, a plurality of modems 130-1 to 130-N for N channels 1 to N are shown. The internal structures of the modems of the base station are the same except that an output signal of the channel assignment controlling portion 110 is supplied to only the modem 130-1 for the channel 1 and that only the modem 130-1 for the channel 1 sends reproduced data to the channel assignment controlling portion 110.

In addition, as the terminal unit 120, M terminal units 120-1 to 120-M are shown. In this case, the structures of the terminal units 120-1 to 120-M are the same.

Next, the operation of the embodiment of the present invention will be described.

Figure 2A:
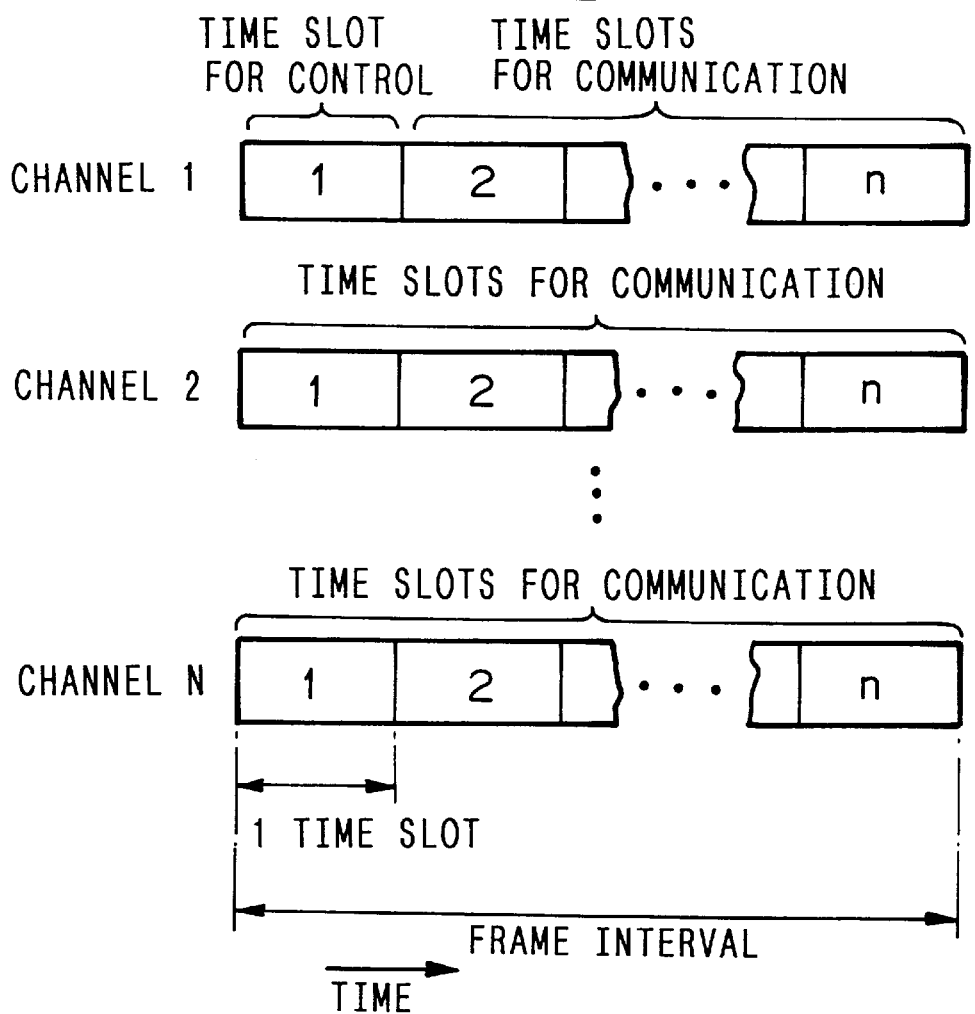
FIGS. 2A and 2B are schematic diagrams showing an example of time slots according to the embodiment of the present invention.
Figure 2B:
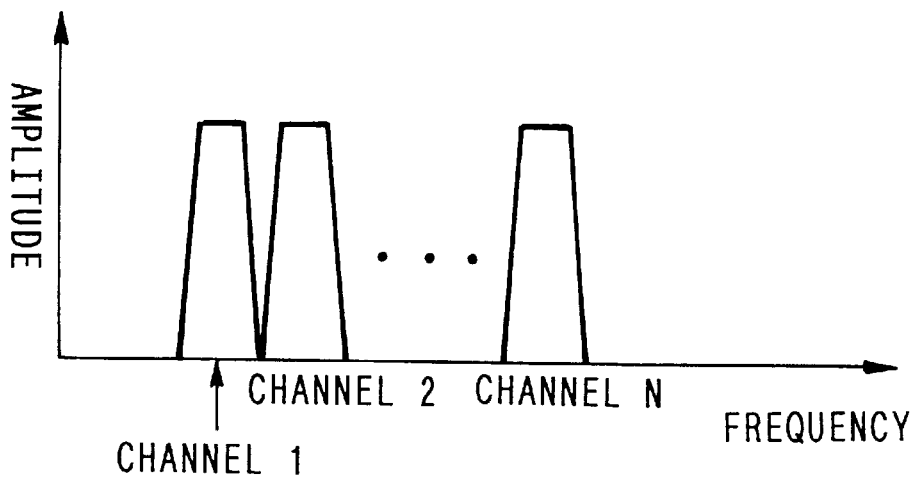

First, the assigning operation of an uplink channel will be described. FIGS. 2A and 2B show a data frame structure and a channel arrangement (frequency band). The first time slot of the channel 1 is used to control channels. The other time slots of the channel 1 and all time slots of the other channels are used to transmit data for communication and audio signal.

When the terminal unit 120 starts a communication with the base station 130, the channel controller 122 sends to the modulator (MOD) 123 a control signal for causing the first time slot of the channel 1 to be selected.

When the modulator (MOD) 123 receives the control signal, it sends to the base station 130 a channel assignment request signal with the first time slot of the channel 1.

The channel assignment request signal is sent to the signal detector 135 of the modem (MODEM) 130 of the base station through the extractor 134 of the channel 1. When the signal detector 135 detects the channel assignment request signal, it is sent to the demodulator (DEM) 133. The demodulator (DEM) 133 demodulates the channel assignment request signal. The unique word detector 132 detects a unique word from the channel assignment request signal.

At this point, although the signal detector 135 has detected the signal, when the unique word detector 132 has not detected the unique word, the channel assignment request signal is lost and thereby the channel is not assigned. In this case, the terminal unit 120 sends the channel assignment request signal to the base station 130 once again after the lapse of a predetermined time period.

On the other hand, when the unique word detector 132 has detected the unique word, the channel assignment request signal is supplied to the channel assignment controlling portion 110.

The channel assignment controlling portion 110 checks only the first time slot of the signal. When the channel assignment controlling portion 110 has detected the channel assignment request signal, it selects a channel and time slots corresponding to a predetermined procedure that will be described later and sends a control signal to the modulator (MOD) 131 of the modem (MODEM) 130 of the base station.

The terminal unit 120 receives the control signal from the modem (MODEM) 130 of the base station with the modem 130-1 and sends the control signal to the demodulator (DEM) 121. The demodulator (DEM) 121 demodulates the control signal and sends the demodulated signal to the channel controller 122. The channel controller 122 causes the modulator (MOD) 123 to send data with the channel and time slots that have been assigned.

Next, the operation of the channel assignment controlling portion 110 will be described.

Figure 3:
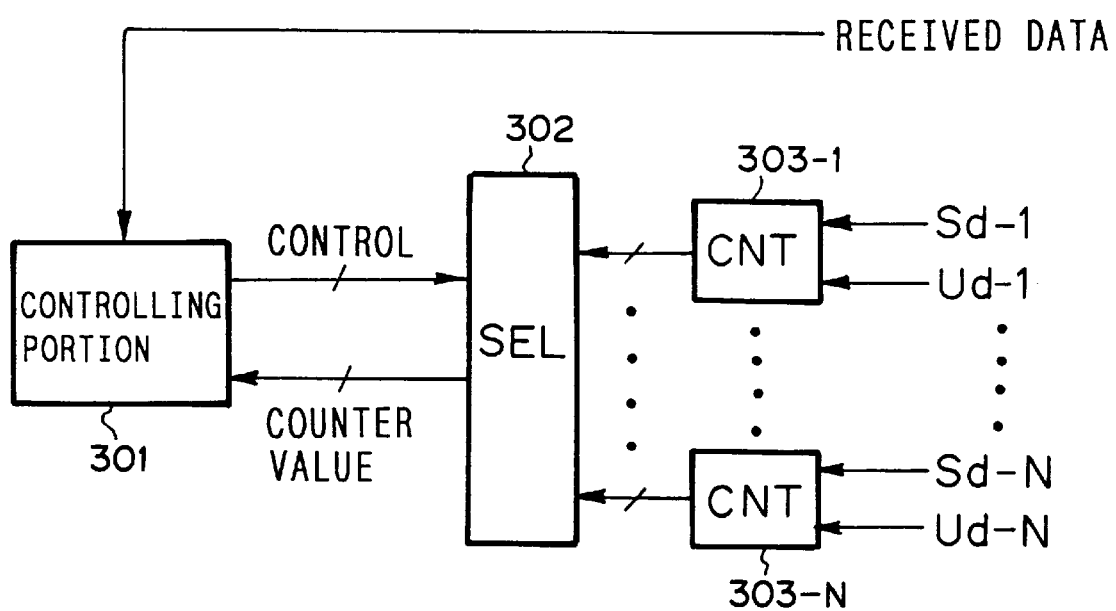
FIG. 3 is a schematic diagram showing an example of the structure of a channel assignment controlling portion according to the embodiment of the present invention.

FIG. 3 shows an example of the structure of the channel assignment controlling portion 110. Referring to FIG. 3, the channel assignment controlling portion 110 comprises a controlling portion 301, a selector (SEL) 302, and a plurality of counters (CNT) 303-1 to 303-N. The controlling portion 301 assigns a channel and time slots and sends a control signal to the modulator (MOD) 131 of the modem 130-1. In FIG. 3, Sd-1 to Sd-N and Ud-1 to Ud-N are signal detection signals and unique word detection signals that the modems (MODEM) 130-1 to 130-N of the base station output.

Now, in this structure, as a result, the signal detection signals and the unique word detection signals detected from the unique word of each time slot of each channel are counted. When the signal detection signal is detected, the signal level thereof becomes "H" (high level). When the signal detection signal is not detected, the signal level thereof becomes "L" (low level). This relation also applied for the unique word detection signal.

In FIG. 3, the received data is an output signal of the modem (MODEM) 130-1 of the base station. The received data is a data portion of which the preamble has been removed from the received signal of the modem (MODEM) 130-1 of the base station.

A counter (CNT) 303 counts only when the signal detection signal Sd is "H" and the unique word detection signal Ud is "L" (namely, only when the signal has not been normally received due to interference). Thus, the value of each of the counters (CNT) 303-1 to 303-N represents the number of times of which data has not been normally received due to interference noise. In other words, the distribution of interference noise of each channel is learnt. In this case, when the counter 303 unlimitedly counts, the counter value gets overflown. Thus, when a predetermined time period has elapsed, it is assumed that the distribution has been learnt. At this point, the counting operation is stopped and reset.

Figure 4:
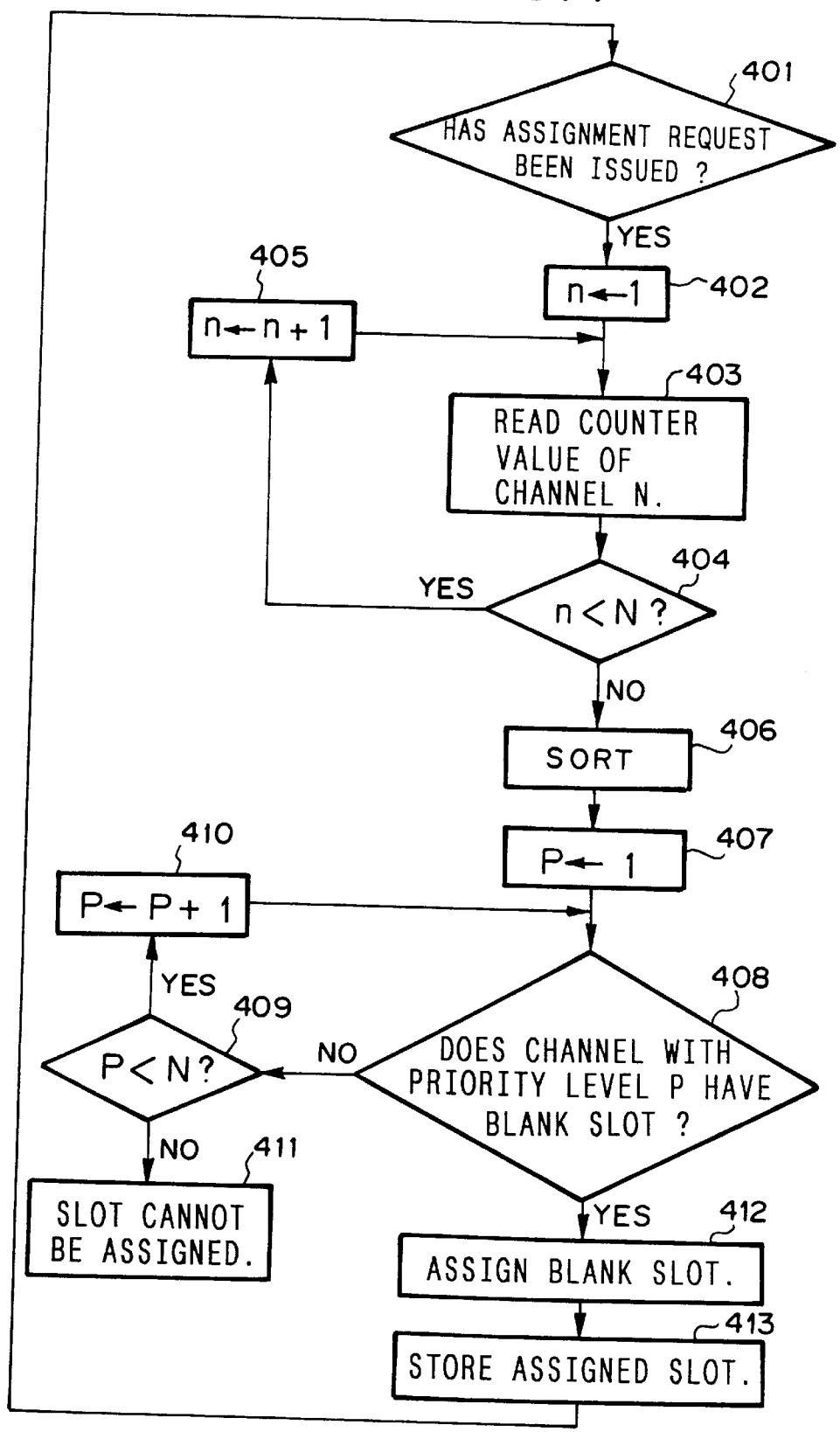
FIG. 4 is a flow chart for explaining a channel assignment controlling operation according to the embodiment of the present invention.

FIG. 4 is a flow chart showing the process of the controlling portion 301. The controlling portion 301 checks only the first time slot of the received data and determines whether or not a channel assignment request has been issued (at step 401). When the channel assignment request has been issued, the controlling portion 301 switches the selector (SEL) 302 by using a control line, reads the counter values of the channels 1 to N by using a counter value line (at steps 402 to 405), and sorts channel numbers in the descending order of the counter values so as to assign priority levels to the channels (at step 406).

It is determined whether or not there is a blank time slot in the order of the higher priority levels of channels (at steps 408 to 410). When there is a blank time slot, it is assigned (at step 412). The assigned time slot is stored (at step 413).

Figure 5:
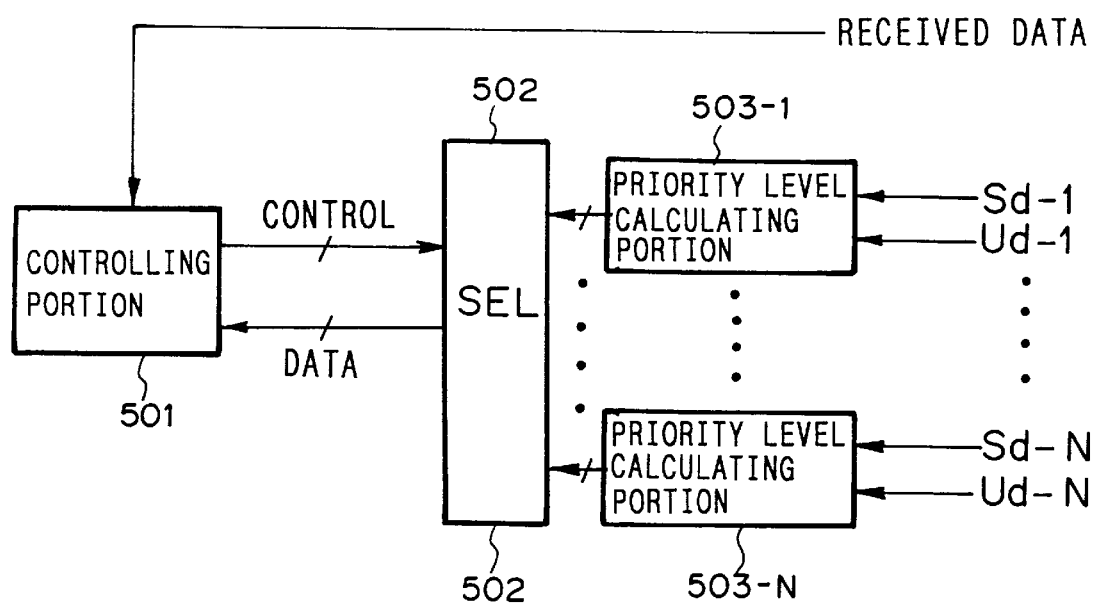
FIG. 5 is a schematic diagram showing another example of the structure of the channel assignment controlling portion according to the embodiment of the present invention.
Figure 6:
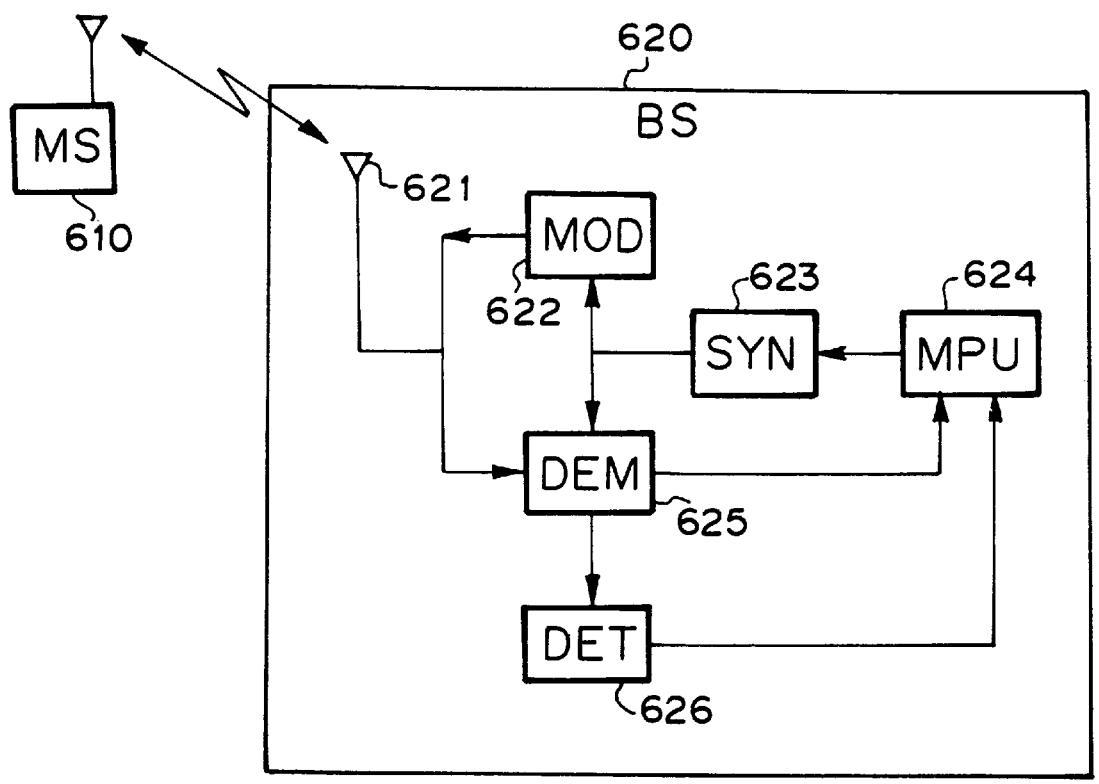
FIG. 6 is a block diagram showing the structure of a related art reference.
Figure 7:
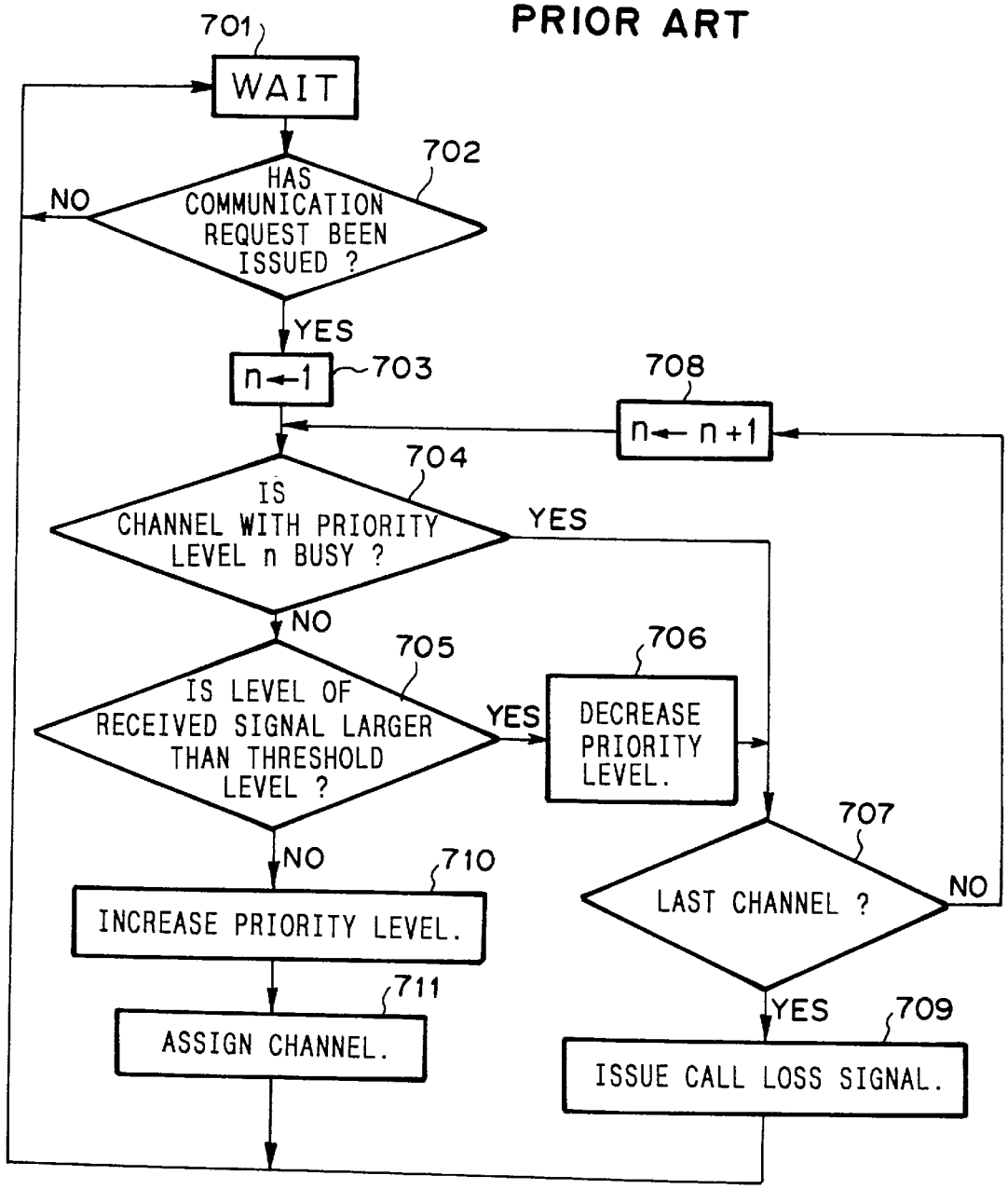
FIG. 7 is a flow chart for explaining the operation of the related art reference.

FIG. 5 is another example of the structure of the channel assignment controlling portion 110. In this structure, the counters 303-1 to 303-N shown in FIG. 3 are substituted with priority level calculating portions 503-1 to 503-N, respectively. Referring to FIG. 5, the channel assignment controlling portion 110 comprises a controlling portion 501, a selector (SEL) 502, and priority level calculating portions 503-1 to 503-N. The controlling portion 501 assigns a channel and time slots and supplies a control signal to the modulator (MOD) 131.

The priority level calculating portion 503 counts the number of times of which the signal detection signal Sd with the level "H" has been input. Assuming that the number of times is denoted by K, the priority level P(n) of the channel n is calculated as follows.

Although the signal detection signal Sd is "H", when the unique word detecting signal Ud is "L", (namely, although the signal has been detected, when the unique word has not been detected), the priority level P(n) is calculated and replaced with the priority level P(n) by the following expression.

$$P(n) \Leftarrow \frac{P(n) \cdot (k-1)}{k}$$

When the signal detection signal Sd is "H" and the unique word detection signal Ud is "H" (namely, when the signal and the unique word have been normally detected), the priority level P(n) is calculated and replaced with the priority level P(n) as follows.

$$P(n) \Leftarrow \frac{P(n) \cdot (k-1) + 1}{k}$$

Thus, P(n) represents the probability of which the unique word is normally detected on channel n. However, K is restricted to upper limit Kmax.

Instead of the counters (CNT) 303-1 to 301-N shown in FIG. 3, P(n) is sorted in the large order of the values thereof (at step 406 of FIG. 4) so as to determine priority levels of channels.

In the structure of the channel assignment controlling portion shown in FIG. 5, unlike with the structure shown in FIG. 3, since it is not necessary to interrupt the learning operation, even if the distribution of interference noise varies time by time, it can continually be learnt. On the other hand, in the structure shown in FIG. 3, only counters are required. In contrast, in the structure shown in FIG. 5, since arithmetic operations should be performed, the resultant circuit becomes complicated.

As described above, according to the embodiment of the present invention, the distribution of interference noise of each channel can be learnt. Thus, channels with small interference can be preferentially assigned.

As described above, in the channel assignment controlling system according to the present invention, with two output signals of a signal detector and a unique word detector of a conventional demodulator of the TDMA system, the distribution of interference noise of each channel is learnt. Channels with small interference are preferentially used and thereby the channel quality can be improved.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A channel assignment controlling system having a terminal unit and a base station for transmitting information from the base station to the terminal unit corresponding to a transmission request issued from the terminal unit, comprising:

a signal detector for detecting a signal from the terminal unit;

a unique word detector for detecting a unique word from the terminal unit; and channel assignment controlling means for learning a distribution of interference noise of each channel corresponding to history information of whether or not the signal has been detected by said signal detector of the base station and whether or not the unique word has been detected by said unique word detector that detects the unique word corresponding to the received signal, determining priority levels of individual channels in the order of smaller interference noise, and preferentially using channels with higher priority levels so as to improve the quality of up-link channels used to transmit information from the terminal to the base station, and further wherein said channel assignment controlling means counts the number of times when the unique word has not been detected although the signal has been detected or calculates the probability of the signal being normally detected corresponding to history information of whether or not the signal has been detected by the signal detector of the base station and whether or not the unique word has been detected by the unique word detector that detects the unique word corresponding to the received signal so as to learn the distribution of the interference noise of each channel, determines priority levels of the individual channels in the order of smaller interference noise, and preferentially use channels with higher priority levels.

2. The channel assignment controlling system as set forth in claim 1, wherein the terminal unit comprises:

a demodulator for inputting an output signal of the base station and demodulating the signal;

a modulator for outputting a transmission signal; and a channel controller for controlling a channel and time slots for the modulator corresponding to information of an output signal of the demodulator, wherein the modulator outputs the transmission signal with the frequency of the channel and time slots controlled by the channel controller.

3. The channel assignment controlling system as set forth in claim 1, wherein the base station comprises:

an extractor for inputting an output signal of the terminal unit and extracting only a signal with the frequency of the channel for the base station from the output signal of the terminal unit;

said signal detector for inputting an output signal of the extractor and measuring the power thereof so as to determine whether the receive signal is present;

a demodulator for inputting an output signal of the extractor and an output signal of the signal detector and demodulating the input signals;

said unique word detector for inputting an output signal of the demodulator and an output signal of the signal detector, detecting a unique word, and determining whether or not the signal has been detected and whether or not the unique word has been detected; and a modulator for inputting an output signal of the channel assignment controlling means and outputting the transmission signal to the base station.

4. The channel assignment controlling system as set forth in claim 1, wherein the channel assignment controlling means comprises:

a counter for inputting an output signal of the signal detector and an output signal of the unique word detector and counting the number of times of which the unique word has not been detected although the signal has been detected for each channel;

a selector for inputting an output signal of the counter and outputting the value of the counter selected corresponding to a selection control signal; and a controlling portion for sending the selection control signal to the selector, reading the counter value for each channel, and preferentially assigning channels in the order of smaller counter values, wherein channels with smaller interference noise are preferentially assigned.

5. The channel assignment controlling system as set forth in claim 1, wherein said channel assignment controlling means comprises:

a priority level calculating portion for inputting the signal detection signal and a unique word detection signal and calculating the probability of which the signal is normally detected;

a selector for inputting an output signal of the priority level calculating portion and outputting an output value of the priority calculating portion selected corresponding to the selection control signal; and a controlling portion for sending the selection control signal to the selector, reading an output signal of the priority level calculating portion of each channel, and preferentially assigning channels in the order of larger output values of the priority level calculating portion, wherein channels with small interference noise are preferentially assigned.

6. The channel assignment controlling system as set forth in claim 2, wherein the channel assignment controlling means comprises:

a counter for inputting an output signal of the signal detector and an output signal of the unique word detector and counting the number of times of which the unique word has not been detected although the signal has been detected for each channel;

a selector for inputting an output signal of the counter and outputting the value of the counter selected corresponding to a selection control signal; and a controlling portion for sending the selection control signal to the selector, reading the counter value for each channel, and preferentially assigning channels in the order of smaller counter values, wherein channels with smaller interference noise are preferentially assigned.

7. The channel assignment controlling system as set forth in claim 2, wherein said channel assignment controlling means comprises:

a priority level calculating portion for inputting the signal detection signal and a unique word detection signal and calculating the probability of which the signal is normally detected;

a selector for inputting an output signal of the priority level calculating portion and outputting an output value of the priority calculating portion selected corresponding to the selection control signal; and a controlling portion for sending the selection control signal to the selector, reading an output signal of the priority level calculating portion of each channel, and preferentially assigning channels in the order of larger output values of the priority level calculating portion, wherein channels with small interference noise are preferentially assigned.

8. The channel assignment controlling system as set forth in claim 3, wherein the channel assignment controlling means comprises:

a counter for inputting an output signal of the signal detector and an output signal of the unique word detector and counting the number of times of which the unique word has not been detected although the signal has been detected for each channel;

a selector for inputting an output signal of the counter and outputting the value of the counter selected corresponding to a selection control signal; and a controlling portion for sending the selection control signal to the selector, reading the counter value for each channel, and preferentially assigning channels in the order of smaller counter values, wherein channels with smaller interference noise are preferentially assigned.

9. The channel assignment controlling system as set forth in claim 3, wherein said channel assignment controlling means comprises:

a priority level calculating portion for inputting the signal detection signal and a unique word detection signal and calculating the probability of which the signal is normally detected;

a selector for inputting an output signal of the priority level calculating portion and outputting an output value of the priority calculating portion selected corresponding to the selection control signal; and a controlling portion for sending the selection control signal to the selector, reading an output signal of the priority level calculating portion of each channel, and preferentially assigning channels in the order of larger output values of the priority level calculating portion, wherein channels with small interference noise are preferentially assigned.

10. The channel assignment controlling system as set forth in claim 1, wherein said channel assignment controlling means calculates the probability of the signal being normally detected corresponding to history information of whether or not the signal has been detected by the signal detector of the base station and whether or not the unique word has been detected by the unique word detector that detects the unique word corresponding to the received signal so as to learn the distribution of the interference noise of each channel, determine priority levels of individual channels in the order of smaller interference noise, and preferentially uses channels with higher priority levels.

11. The channel assignment controlling system as set forth in claim 10, wherein the terminal unit comprises:

a demodulator for inputting an output signal of the base station and demodulating the signal;

a modulator for outputting a transmission signal; and a channel controller for controlling a channel and time slots for the modulator corresponding to information of an output signal of the demodulator, wherein the modulator outputs the transmission signal with the frequency of the channel and time slots controlled by the channel controller.

12. The channel assignment controlling system as set forth in claim 10, wherein the base station comprises:

an extractor for inputting an output signal of the terminal unit and extracting only a signal with the frequency of the channel for the base station from the output signal of the terminal unit;

said signal detector for inputting an output signal of the extractor and measuring the power thereof so as to determine whether the receive signal is present;

a demodulator for inputting an output signal of the extractor and an output signal of the signal detector and demodulating the input signals;

said unique word detector for inputting an output signal of the demodulator and an output signal of the signal detector, detecting a unique word, and determining whether or not the signal has been detected and whether or not the unique word has been detected; and a modulator for inputting an output signal of the channel assignment controlling means and outputting the transmission signal to the base station.

13. The channel assignment controlling system as set forth in claim 10, wherein the channel assignment controlling means comprises:

a counter for inputting an output signal of the signal detector and an output signal of the unique word detector and counting the number of times of which the unique word has not been detected although the signal has been detected for each channel;

a selector for inputting an output signal of the counter and outputting the value of the counter selected corresponding to a selection control signal; and a controlling portion for sending the selection control signal to the selector, reading the counter value for each channel, and preferentially assigning channels in the order of smaller counter values, wherein channels with smaller interference noise are preferentially assigned.

14. The channel assignment controlling system as set forth in claim 10, wherein said channel assignment controlling means comprises:

a priority level calculating portion for inputting the signal detection signal and a unique word detection signal and calculating the probability of which the signal is normally detected;

a selector for inputting an output signal of the priority level calculating portion and outputting an output value of the priority calculating portion selected corresponding to the selection control signal; and a controlling portion for sending the selection control signal to the selector, reading an output signal of the priority level calculating portion of each channel, and preferentially assigning channels in the order of larger output values of the priority level calculating portion, wherein channels with small interference noise are preferentially assigned.

15. A channel assignment controlling system having a terminal unit and a base station for transmitting information from the base station to the terminal unit corresponding to a transmission request issued from the terminal unit, comprising:

channel assignment controlling means for learning a distribution of interference noise of each channel corresponding to history information of whether or not a signal has been detected by a signal detector of the base station and whether or not a unique word has been detected by a unique word detector that detects the unique word corresponding to the received signal, determining priority levels of individual channels in the order of smaller interference noise, and preferentially using channels with higher priority levels so as to improve the quality of up-link channels used to transmit information from the terminal to the base station;

wherein the terminal unit comprises:

a demodulator for inputting an output signal of the base station and demodulating the signal;

a modulator for outputting a transmission signal; and a channel controller for controlling a channel and time slots for the modulator corresponding to information of an output signal of the demodulator, wherein the modulator outputs the transmission signal with the frequency of the channel and time slots controlled by the channel controller, and wherein the base station comprises:

an extractor for inputting an output signal of the terminal unit and extracting only a signal with the frequency of the channel for the base station from the output signal of the terminal unit;

a signal detector for inputting an output signal of the extractor and measuring the power thereof so as to determine whether the receive signal is present;

a demodulator for inputting an output signal of the extractor and an output signal of the signal detector and demodulating the input signals;

a unique word detector for inputting an output signal of the demodulator and an output signal of the signal detector, detecting a unique word, and determining whether or not the signal has been detected and whether or not the unique word has been detected; and a modulator for inputting an output signal of the channel assignment controlling means and outputting the transmission signal to the base station and further wherein said channel assignment controlling means counts the number of times when the unique word has not been detected although the signal has been detected or calculates the probability of the signal being normally detected corresponding to history information of whether or not the signal has been detected by the signal detector of the base station and whether or not the unique word has been detected by the unique word detector that detects the unique word corresponding to the received signal so as to learn the distribution of the interference noise of each channel, determines priority levels of the individual channels in the order of smaller interference noise, and preferentially use channels with higher priority levels.

* * * * *